(12) United States Patent
Khinchuk

(10) Patent No.: US 10,354,622 B2
(45) Date of Patent: Jul. 16, 2019

(54) SPORTING EVENT DISPLAY MANAGEMENT SYSTEM

(71) Applicant: Contour Design, Inc., Windham, NH (US)

(72) Inventor: Anton Khinchuk, Burlington, MA (US)

(73) Assignee: CONTOUR DESIGN, INC., Windham, NH (US)

( * ) Notice: Subject to any disclaimer, the term of this patent is extended or adjusted under 35 U.S.C. 154(b) by 427 days.

(21) Appl. No.: 15/189,272

(22) Filed: Jun. 22, 2016

(65) Prior Publication Data

US 2016/0372087 A1     Dec. 22, 2016

Related U.S. Application Data

(60) Provisional application No. 62/298,727, filed on Feb. 23, 2016, provisional application No. 62/182,707, filed on Jun. 22, 2015.

(51) Int. Cl.

| | |
|---|---|
| *G06F 3/048* | (2013.01) |
| *G09G 5/377* | (2006.01) |
| *A63B 71/06* | (2006.01) |
| *G06F 3/0482* | (2013.01) |
| *G06F 3/0484* | (2013.01) |
| *G09G 5/14* | (2006.01) |
| *G06Q 30/02* | (2012.01) |
| *G06Q 50/00* | (2012.01) |

(Continued)

(52) U.S. Cl.
CPC ............ *G09G 5/377* (2013.01); *A63B 71/06* (2013.01); *G06F 3/0482* (2013.01); *G06F 3/04847* (2013.01); *G06Q 30/0241* (2013.01); *G06Q 50/01* (2013.01); *G06Q 50/34* (2013.01); *G09G 5/14* (2013.01); *G09G 5/00* (2013.01); *G09G 2320/10* (2013.01); *G09G 2340/12* (2013.01); *G09G 2340/145* (2013.01); *G09G 2354/00* (2013.01)

(58) Field of Classification Search
None
See application file for complete search history.

(56) References Cited

U.S. PATENT DOCUMENTS

| | | |
|---|---|---|
| 5,860,862 A | 1/1999 | Junkin |
| 6,193,610 B1 | 2/2001 | Junkin |

(Continued)

*Primary Examiner* — William C Trapanese
(74) *Attorney, Agent, or Firm* — Lando & Anastasi, LLP

(57) ABSTRACT

A method allocates screen space for display of a plurality of prescribed messages on a display device during a sporting event having a plurality of activities. Each activity ultimately has an outcome and takes an activity time to complete. To that end, the method receives a stream of electronic, machine readable real-time event information, and displays an event user interface having selection indicia. The selection indicia enable a user to predict the outcome of at least one activity of the sporting event in real time. The method assigns, to each message, a prescribed display number that is equal to a prescribed number of predictions, and receives a plurality of predictions from the event user interface. The method also displays, in series, each of the plurality of messages in the foreground of the display in real time when receiving the stream of real-time event information.

27 Claims, 11 Drawing Sheets

(51) Int. Cl.
*G06Q 50/34* (2012.01)
*G09G 5/00* (2006.01)

(56) References Cited

U.S. PATENT DOCUMENTS

| | | | |
|---|---|---|---|
| 6,394,899 B1 * | 5/2002 | Walker | G07F 17/32 |
| | | | 273/460 |
| 6,840,861 B2 * | 1/2005 | Jordan | A63F 13/12 |
| | | | 340/323 R |
| 6,884,166 B2 | 4/2005 | Leen et al. | |
| 6,899,628 B2 | 5/2005 | Leen et al. | |
| 7,029,394 B2 | 4/2006 | Leen et al. | |
| 7,534,169 B2 | 5/2009 | Amaitis et al. | |
| 8,342,924 B2 | 1/2013 | Leen et al. | |
| 8,622,798 B2 | 1/2014 | Lockton et al. | |
| 8,638,517 B2 | 1/2014 | Lockton et al. | |
| 8,641,511 B2 | 2/2014 | Ginsberg et al. | |
| 8,659,848 B2 | 2/2014 | Lockton et al. | |
| 8,699,168 B2 | 4/2014 | Lockton et al. | |
| 8,705,195 B2 | 4/2014 | Lockton | |
| 8,717,701 B2 | 5/2014 | Lockton et al. | |
| 8,737,004 B2 | 5/2014 | Lockton et al. | |
| 8,780,482 B2 | 7/2014 | Lockton et al. | |
| 8,817,408 B2 | 8/2014 | Lockton et al. | |
| 8,837,072 B2 | 9/2014 | Lockton et al. | |
| 8,870,639 B2 | 10/2014 | Lockton et al. | |
| 8,935,715 B2 | 1/2015 | Cibula et al. | |
| 9,056,251 B2 | 6/2015 | Lockton | |
| 9,067,143 B2 | 6/2015 | Lockton et al. | |
| 9,111,417 B2 | 8/2015 | Leen et al. | |
| 9,205,339 B2 | 12/2015 | Cibula et al. | |
| 9,233,293 B2 | 1/2016 | Lockton | |
| 9,258,601 B2 | 2/2016 | Lockton et al. | |
| 9,270,789 B2 | 2/2016 | Huske et al. | |
| 9,314,686 B2 | 4/2016 | Lockton | |
| 9,314,701 B2 | 4/2016 | Lockton et al. | |
| 9,457,272 B2 | 10/2016 | Lockton et al. | |
| 9,498,724 B2 | 11/2016 | Lockton et al. | |
| 9,501,904 B2 | 11/2016 | Lockton | |
| 9,504,922 B2 | 11/2016 | Lockton et al. | |
| 9,526,991 B2 | 12/2016 | Lockton et al. | |
| 9,604,140 B2 | 3/2017 | Lockton et al. | |
| 9,652,937 B2 | 5/2017 | Lockton | |
| 9,662,576 B2 | 5/2017 | Lockton et al. | |
| 9,662,577 B2 | 5/2017 | Lockton et al. | |
| 9,672,692 B2 | 6/2017 | Lockton | |
| 9,687,738 B2 | 6/2017 | Lockton et al. | |
| 9,687,739 B2 | 6/2017 | Lockton et al. | |
| 9,707,482 B2 | 7/2017 | Lockton et al. | |
| 9,716,918 B1 | 7/2017 | Lockton et al. | |
| 9,724,603 B2 | 8/2017 | Lockton et al. | |
| 9,744,453 B2 | 8/2017 | Lockton et al. | |
| 9,821,233 B2 | 11/2017 | Lockton et al. | |
| 9,878,243 B2 | 1/2018 | Lockton et al. | |
| 9,901,820 B2 | 2/2018 | Lockton et al. | |
| 9,908,053 B2 | 3/2018 | Lockton et al. | |
| 9,919,210 B2 | 3/2018 | Lockton | |
| 9,919,211 B2 | 3/2018 | Lockton et al. | |
| 9,919,221 B2 | 3/2018 | Lockton et al. | |
| 2005/0227757 A1 * | 10/2005 | Simon | G06Q 50/34 |
| | | | 463/25 |
| 2008/0059571 A1 | 3/2008 | Khoo | |
| 2011/0028203 A1 | 2/2011 | Agarwal et al. | |
| 2012/0214575 A1 * | 8/2012 | Amaitis | G06Q 50/34 |
| | | | 463/25 |
| 2013/0225285 A1 | 8/2013 | Lockton | |
| 2014/0018156 A1 * | 1/2014 | Rizzotti | A63F 13/12 |
| | | | 463/25 |
| 2016/0054872 A1 | 2/2016 | Cibula et al. | |
| 2016/0134947 A1 | 5/2016 | Huske et al. | |
| 2016/0300433 A1 * | 10/2016 | Ortiz | G07F 17/3211 |
| 2017/0001115 A1 | 1/2017 | Melinger et al. | |
| 2017/0036110 A1 | 2/2017 | Lockton et al. | |
| 2017/0053498 A1 | 2/2017 | Lockton | |
| 2017/0221314 A1 | 8/2017 | Locton | |
| 2017/0225071 A1 | 8/2017 | Lockton et al. | |
| 2017/0252649 A1 | 9/2017 | Lockton et al. | |
| 2017/0264961 A1 | 9/2017 | Lockton | |
| 2017/0282067 A1 | 10/2017 | Lockton et al. | |
| 2017/0296916 A1 | 10/2017 | Lockton et al. | |
| 2017/0358173 A1 | 12/2017 | McCafferty | |
| 2018/0025586 A1 | 1/2018 | Lockton | |
| 2018/0104582 A1 | 4/2018 | Lockton et al. | |
| 2018/0104596 A1 | 4/2018 | Lockton et al. | |
| 2018/0117464 A1 | 5/2018 | Lockton et al. | |

* cited by examiner

SPORTING EVENT DISPLAY MANAGEMENT SYSTEM

PRIORITY

This patent application claims priority from provisional U.S. patent application No. 62/182,707, filed Jun. 22, 2015, and naming Anton Khinchuk as inventor, the disclosure of which is incorporated herein, in its entirety, by reference.

This patent application also claims priority from provisional U.S. patent application No. 62/298,727, filed Feb. 23, 2016, and naming Anton Khinchuk as inventor, the disclosure of which is incorporated herein, in its entirety, by reference.

RELATED APPLICATION

This patent application is related to U.S. patent application Ser. No. 15/189,261, entitled, "Sporting Event Display Device System," filed on Jun. 22, 2016, the disclosure of which is incorporated herein, in its entirety, by reference.

FIELD OF THE INVENTION

Illustrative embodiments of the invention generally relate to operator interfaces on display devices and, more particularly, illustrative embodiments relate to providing a specific element in an interface with which a user can interact during an event.

BACKGROUND OF THE INVENTION

By their very nature, display devices have a limited amount of real estate for displaying graphical information. This problem becomes more acute with smaller computing devices, such as mobile computers (e.g., laptops and smartphones). For example, a smartphone may display messages from multiple different sponsors of an application it is executing (also referred to as an "app"), as well as the graphical information of the app itself (e.g., a game or map). Undesirably, in view of the limited screen size, not all messages can be displayed on the screen in an efficient manner.

SUMMARY OF VARIOUS EMBODIMENTS

In accordance with one embodiment of the invention, a method allocates screen space for display of a plurality of prescribed messages on a display device during a sporting event having a plurality of activities. Each activity ultimately has an outcome and takes an activity time to complete. To that end, the method receives a stream of electronic, machine readable real-time event information relating to the sporting event, and displays, on the display device in real time when receiving the stream of real-time event information, an event user interface having selection indicia. The selection indicia are configured to enable a user to predict the outcome of at least one of the plurality of activities of the sporting event in real time.

At some earlier or later time, the method assigns, to each message, a prescribed display number that is equal to a prescribed number of activities of the sporting event, and receives a plurality of predictions from the event user interface. The method also displays, in series, each of the plurality of messages in the foreground of the display in real time when receiving the stream of real-time event information. Each message preferably is displayed for no more than a total time period during the event. Specifically, the total time period is a function of both 1) the prescribed display number, and 2) the activity time for the activity being completed when the message is displayed. More specifically, the prescribed display number may be equal to a prescribed number of past and/or potential future predictions using the event user interface during the sporting event.

The method may display, in series, each of the plurality of messages by displaying a first message during a first activity of the event, displaying a second message during a second activity of the event, and displaying the first message during a third activity of the event. In that case, the second activity may have occurred between the first and third activities. Alternatively, the method may display, in series, each of the plurality of messages by displaying a first message during a first activity of the event, displaying the first message during a second activity of the event, and displaying a second message during a third activity of the event. In this latter case, the first and second activities may have been consecutive activities, while the third activity may have taken place before or after the first and second activities.

To limit prediction making, the method may provide a prescribed time for the user to make the prediction with the event user interface. The total time period thus also may be a function of the prescribed time for the user to make the prediction. Moreover, the message preferably is spaced from and not covering the event user interface. Alternatively, the message may cover some portion of the event user interface. Moreover, among other things, the message may have selectable indicia that, when selected, produces a visual code in response to the selection.

Among other things, the sporting event may be a football game or a baseball game. For example, when a baseball game, the given activity may be an at-bat of a player of the baseball game. The stream of real-time event information also may be received live or delayed by no more than about 45 seconds from live.

In accordance with another embodiment of the invention, a sporting event display system more efficiently allocates screen space for display of a plurality of prescribed messages on a display device during a sporting event having a plurality of activities. Like other embodiments, each activity ultimately has an outcome and taking an activity time to complete. The system thus has an input to receive input information. Among other things, the input information includes a stream of electronic, machine readable real-time event information relating to the sporting event. The system also has a display operatively coupled with the input. The display is configured to display, in real time when receiving the stream of real-time event information, an event user interface having selection indicia. The selection indicia are configured to enable a user to predict the outcome of at least one of the plurality of activities of the sporting event in real time.

The display system also has a message controller operatively coupled with the display. The message controller is configured to assign, to each message, a prescribed display number that is equal to a prescribed number of predictions using the event user interface during the sporting event. As such, the input information also includes a plurality of predictions from the event user interface. The message controller thus also is configured to display, in series, each of the plurality of messages in the foreground of the display in real time when receiving the stream of real-time event information. Specifically, each message is displayed for no more than a total time period during the event. The total time period is a function of both 1) the prescribed display number, and 2) the activity time for the activity being completed when the message is displayed.

Illustrative embodiments of the invention are implemented as a computer program product having a computer usable medium with computer readable program code thereon. The computer readable code may be read and utilized by a computer system in accordance with conventional processes.

BRIEF DESCRIPTION OF THE DRAWINGS

Those skilled in the art should more fully appreciate advantages of various embodiments of the invention from the following "Description of Illustrative Embodiments," discussed with reference to the drawings summarized immediately below.

DESCRIPTION OF ILLUSTRATIVE EMBODIMENTS

In illustrative embodiments, an event display system more efficiently displays a plurality of messages across the limited screen space of a computing device, such as a smartphone. More generally, the display system has a plurality of prescribed messages intended to be displayed on the screen of a computing device during a sporting event. When using the event display system, a user makes one or more predictions of the outcome(s) of certain actions in the sporting event. Displaying many or all the messages at the same time during the sporting event typically is impractical. Thus, to optimize use of the limited screen space during the sporting event, the event display system displays the messages on the screen, in a serial manner, based at least upon a prescribed number of activities of the event.

For example, the event display system may display a first message during the time it takes to complete a specific activity, such as a player's at-bat during a nine-inning baseball game. That first message may be permitted to be displayed in that manner, for example, for some duration of up to three different at-bats. The display system thus may display the other prescribed messages during two additional at-bats for the same player, or for another player. Details of illustrative embodiments are discussed below.

Figure 1:
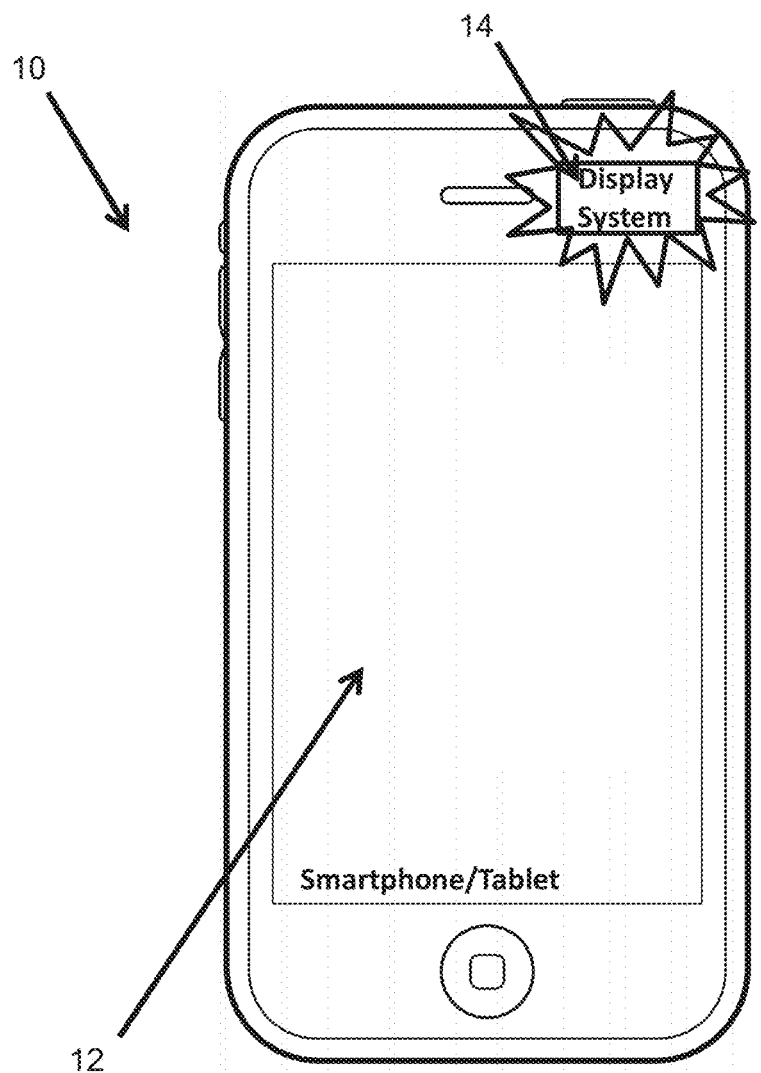
FIG. 1 schematically shows a computer device that may implement illustrative embodiments of the invention.

FIG. 1 schematically shows a computing device 10 that may implement illustrative embodiments of the invention. Specifically, the computing device 10 in this embodiment is a smartphone or tablet (also referred to in this description using reference number "10"). For example, among other similar devices, the smartphone 10 may be an IPHONE™, while the tablet 10 may be an IPAD™ Both of these computing devices 10 are distributed by Apple Inc., of Cupertino, Calif.

As with these and other similar computing devices 10, screen space is at a premium. Specifically, even a reasonably large currently available smartphone 10 may have a screen 12 (also referred to as a "display") that is only about 4 inches high and 2.3 inches wide. This limited area of screen space thus displays only a correspondingly small amount of visual indicia to the user. Accordingly, use of the available screen space is limited. This technical problem consequently can degrade the user experience, as well as reduce revenue generating advertising opportunities.

For example, many applications running on smartphones 10 often receive much of their direct and indirect revenue by displaying paid advertisements and/or other types of messages. It is a continual challenge to determine how and when to display such messages. For example, prior art systems known to the inventors display messages for a prescribed time period. While that may be useful in non-event applications, the inventors recognized that for sporting events, another, different type of message display mechanism more effectively displays this plurality of messages—a mechanism that effectively maximizes available screen space. To that end, illustrative embodiments time both the presentation and duration of a message as a function of a live activity of the underlying sporting event. At the same time, the sporting event drives the event application (i.e., the event application is synchronized with the real-time sporting event).

Figure 2:
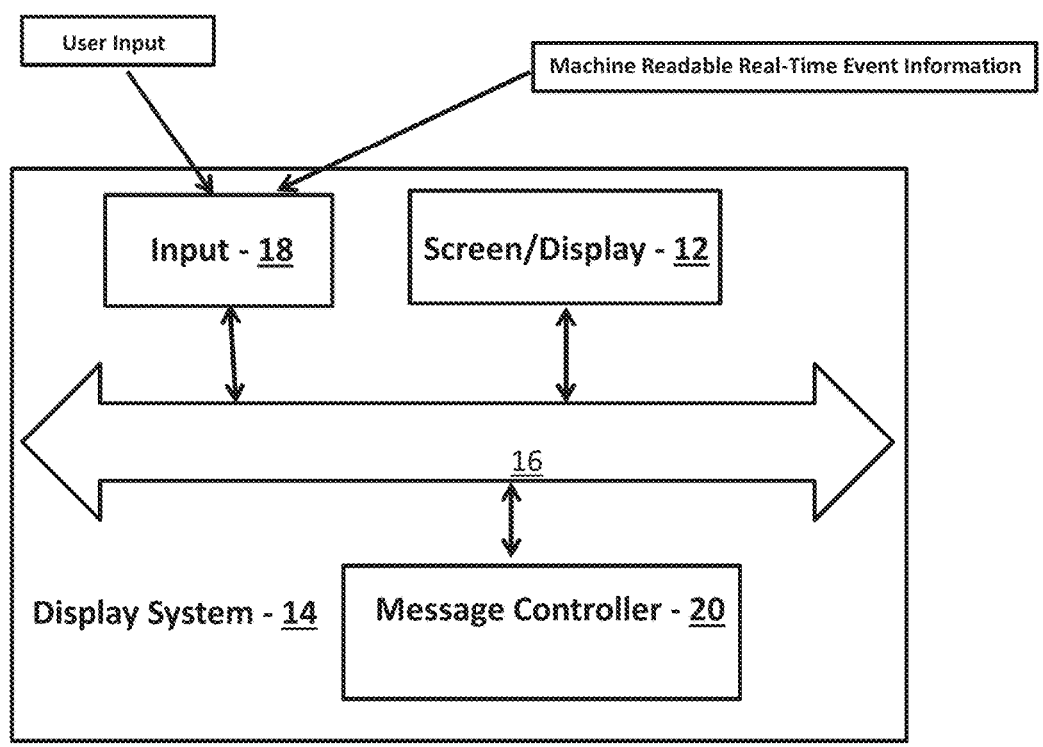
FIG. 2 schematically shows a display control system of the computer device of FIG. 1 configured in accordance with illustrative embodiments of the invention.

To implement this functionality, the smartphone 10 has a display system 14, shown generally in FIG. 1 and schematically in more detail in FIG. 2. Specifically, FIG. 2 schematically shows a block diagram of the display system 14, which, alone or with other logic, may control the screen 12 of the smartphone 10, tablet 10, or other computing device 10 with limited screen space (e.g., a desktop computing device 10). The display system 14 may be part of the noted event application executing on the computing device 10, an independent processing module on the computing device 10, part of the computing device 10 itself, or shared between some or all of those entities.

Each of the components of the display system 14 is operatively connected by a conventional interconnect mechanism. FIG. 2 simply shows a bus 16 communicating each the components. Those skilled in the art should understand that this generalized representation can be modified to include other conventional direct or indirect connections. Accordingly, discussion of the bus 16 is not intended to limit various embodiments.

Indeed, it should be noted that FIG. 2 only schematically shows each of the components of the display system 14. Those skilled in the art should understand that each of these components can be implemented in a variety of conventional manners, such as by using hardware, software, or a combination of hardware and software, across one or more other functional components. For example, the below discussed message controller 20 may be implemented using a plurality of microprocessors executing firmware or application software. As another example, the message controller 20 may be implemented using one or more application specific integrated circuits (i.e., "ASICs") and related software, or a combination of ASICs, discrete electronic components (e.g., transistors), and microprocessors. Accordingly, the representation of the message controller 20 and other components in a single box of FIG. 2 is for simplicity purposes only. In fact, in some embodiments, the message controller 20 of FIG. 2 is distributed across a plurality of different devices—for example, within multiple integrated circuits or devices (e.g., some of it executed from a component across a wireless connection).

It should be reiterated that the representation of FIG. 2 is a significantly simplified representation of an actual display system 14. Those skilled in the art should understand that such a device may have other physical and functional components, such as a central processing unit and memory. Accordingly, this discussion is in no way intended to suggest that FIG. 2 represents all of the elements of a display system 14.

The display system 14 thus has an input 18 for receiving information from any of a variety of sources. The input 18 physically may include a single port, or a plurality of ports. Moreover, among other things, the input sources may include input data from a user interacting with a user interface of either the application or the device itself. For example, the user interface may include a graphical user interface (e.g., discussed below with reference to FIGS. 4-10), an accelerometer in the smartphone 10, or a microphone in the smartphone 10. The input 18 also preferably receives machine-readable, real time event information relating to an event. As discussed below, the application executes based on this real time event information.

Specifically, as discussed in greater detail below, illustrative embodiments are implemented as part of a sporting event application that enables a user to predict the outcomes of certain activities within the sporting event. The machine-readable, real time event information therefore preferably includes real time information relating to the sporting event itself. For example, that information may include the time left in a football game, or the pace and leaders an automobile race (e.g., a NASCAR™ race). As a further example, if used for a baseball event application, that information may include a real-time information feed relating to the game in progress, such as (among other things) the number of balls and strikes of a player/batter during an at-bat in a baseball game, the number of outs, the score, the inning, names of players up to bat and on base, player statistics, the outcome of an at-bat (e.g., if the player made an out or got a hit), and the bases having a baserunner, and the receipt of each pitch.

The display system 14 also may be considered to include the prior noted screen 12, such as a high definition liquid crystal display screen, and a message controller 20 (briefly mentioned above) that controls display of messages on the screen 12. The message controller 20 may display specific messages on the screen 12 based upon specific activities of the underlying event.

Figure 3A:
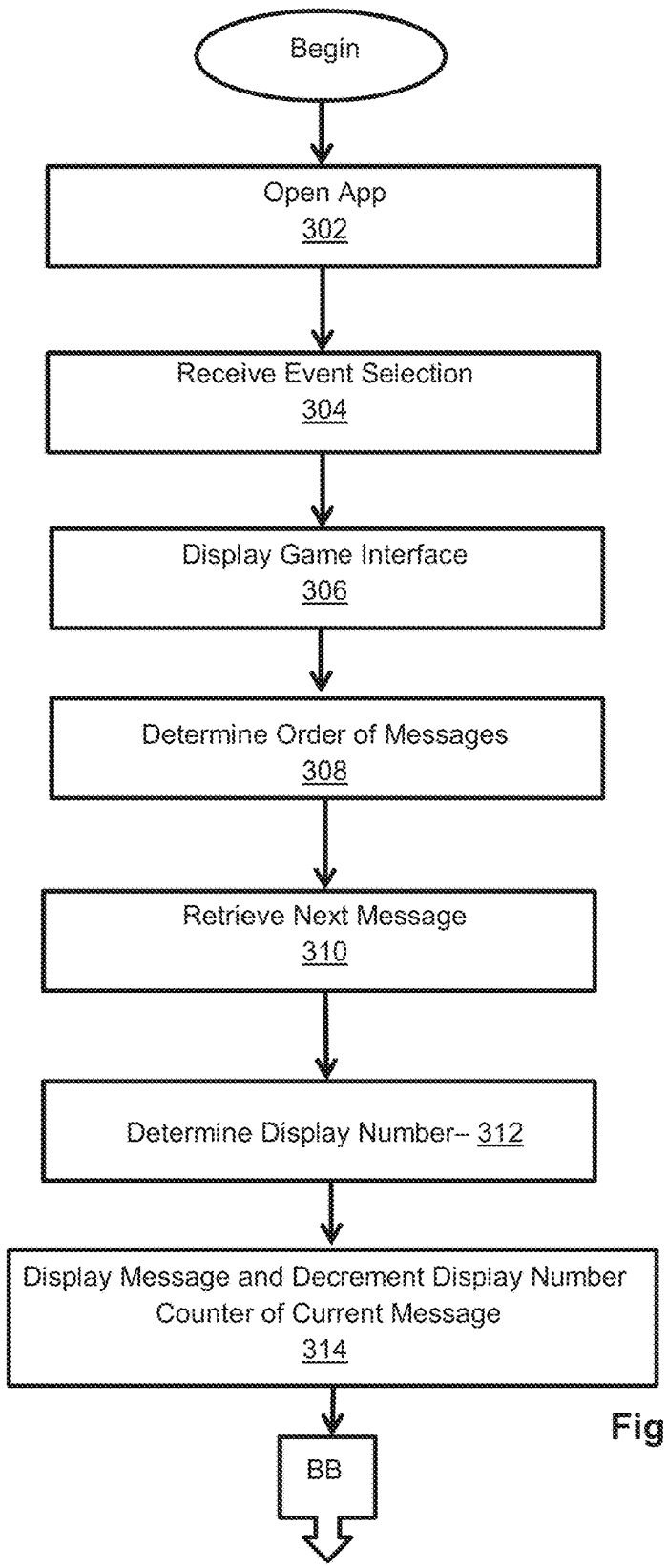
FIGS. 3A and 3B show a process of using an event application and the operation of the display control system of FIG. 2 in accordance with illustrative embodiments of the invention.
Figure 3B:
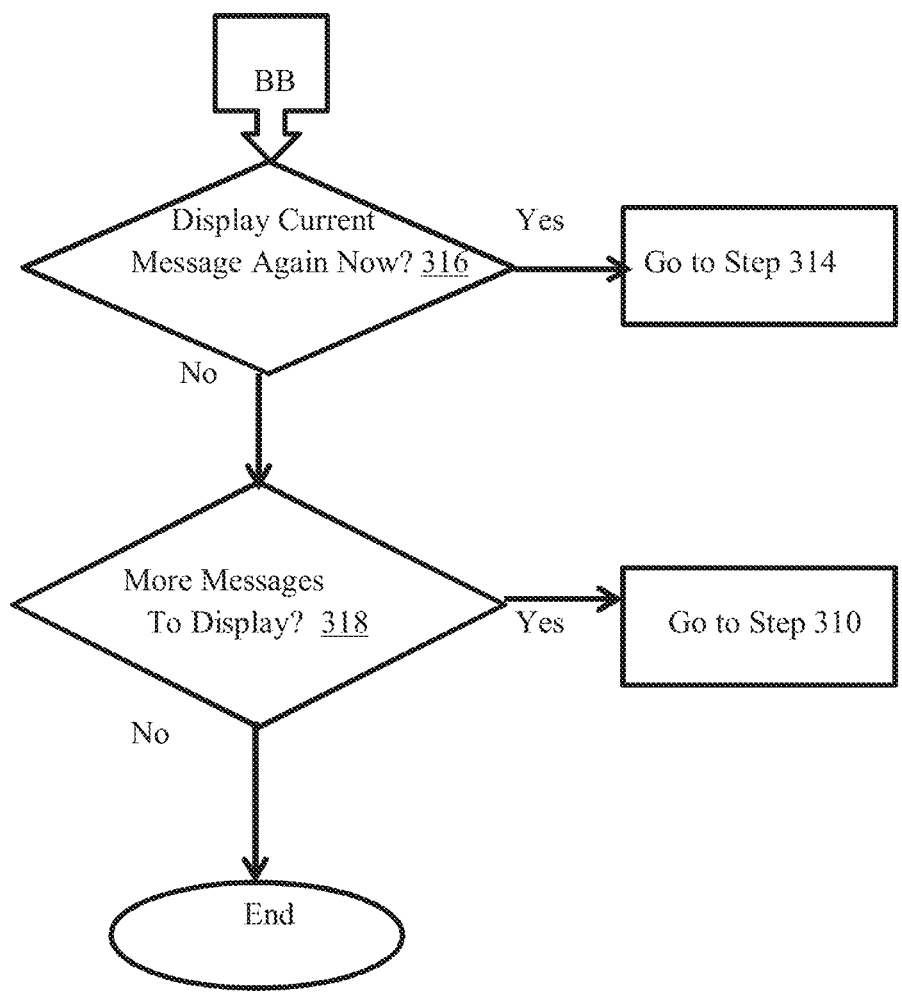

FIGS. 3A and 3B show a process of using the noted event application (also known in the art as an "app") and the operation of the display control system of FIG. 2 in accordance with illustrative embodiments of the invention. It should be noted that this process is simplified from a longer process that likely would be used to intelligently display a message using the event application. Accordingly, this process can have additional steps, such as other processing, storage, or data retrieval steps, which those skilled in the art likely would use. In addition, some of the steps may be performed in a different order than that shown, or at the same time. Those skilled in the art therefore can modify the process as appropriate.

The process of FIGS. 3A and 3B begins at step 302, in which a user opens the event application. In illustrative embodiments, the event application enables a user to predict the outcome of certain activities within a sporting event, in real time, before those activities are completed. For example, if the sporting event is a baseball game, the user may predict whether a given player, before or at the time that player is up to bat (i.e., not after the at-bat), will get a hit, walk, or out during his/her at-bat. In illustrative embodiments, rather than just predicting whether the player will get a hit, the user predicts the type of hit, such as a single, a double, triple, or a home run.

The event application preferably assigns points to each possible designated outcome, and uses a formula to arrive at a total score for the user at the end of the game. To encourage more risky predictions, outcomes that are less likely may be assigned higher point values than those with lower possible outcomes. For example, the successful prediction that a player may make an out, which is quite common, may be worth only 5 points, while the successful prediction that a player may hit a triple, which is quite uncommon, may be worth 40 points. Varying the points in this manner encourages users to make riskier predictions to yield potentially higher point totals.

The event application may be used simultaneously by a plurality of different users that are competing to obtain the highest point total at the end of the event. In that case, the user with the highest point total at the end of the event may receive some recognition or award, such as a gift card from a sponsor, their name on the scoreboard during the next game, or simply the satisfaction of having the highest point total. Accordingly, in that case, the event application has a social aspect to it, enabling different uses to collaborate and compete. Alternatively, some users may simply prefer to use the event application without this social aspect, instead just using it by themselves.

Some embodiments permit the user to accumulate points across multiple games. For example, a user may accumulate 150 points across four different games. In fact, the user need not use the event application for entire games. Instead, the user may play partial games, such as by using it for only one at-bat, or for several at-bats in a given game. The example of 150 accumulated points thus may have been generated by the user playing/engaging during one entire game, and only a few at-bats in three other games. A sponsor or host of the event application may enable the user to apply accumulated points to receive some benefit, such as those discussed above (e.g., a gift card from a sponsoring company). This should incentivize the user to continue playing the game to receive further benefits.

As noted below, the user preferably uses the event application, and the event application executes, as a function of the real time of the game. For example, the user preferably uses the event application during the actual time that the event occurs. Indeed, there may be small variations to this theme. Specifically, as is common in modern sporting events, there may be a delay for a television or radio broadcast of the event by some prescribed period of time, such as 10-45 seconds. In that case, the event application may execute with a corresponding delay (e.g., the same delay) and, in some embodiments, still be considered "real time." For example, the GPS functionality of the smartphone 10 may recognize that a user is watching the game in the stadium and thus, ensure that the event application executes using the actual time of the game. Accordingly, in this case, the event application is synchronized to the actual play timing of the underlying game. In a corresponding manner, the GPS functionality of the smartphone 10 may recognize that a person is not at the stadium. In that case, the event application may (or may not) program in some delay from the real-time live play, such as 10 seconds. In this manner, the event application is synchronized to the timing of the game on the television. Accordingly, illustrative embodiments synchronize the event application with the event based on the potential means the user has to view the event. It should be noted, however, that the user may use the event application without viewing the event at all.

This real-time aspect has a number of benefits. For example, it engages fans/users watching a game when there is some down time during at-bats. Specifically, major-league baseball officials have indicated that fans undesirably tend to become bored during long at-bats for a number of reasons. The event application therefore engages the fan/user, hopefully eliminating this pervasive problem.

In alternative embodiments, the event may be recorded and played back well after the actual date of the event. In that case, the event application may be synchronized to the timing of the recorded version of the event and thus, still be considered to be operating in real time from the perspective of the event application, but not live real-time, such as discussed above. Such an embodiment may have less appeal because some users may already have seen the event and thus, have some knowledge of the outcomes of the activities. However, this alternative embodiment may have some appeal to people attempting to demonstrate their knowledge of a specific event that took place in the past.

For simplicity, illustrative embodiments are discussed using baseball as an example of the sporting event. Those skilled in the art, however, should recognize that the event application can be used with a wide variety of different types of events. For example, among other sporting events, the event application can be used with football, hockey, soccer, basketball, horse racing, Olympic events, track and field, cricket, auto racing, skiing, swimming races, martial arts (e.g., karate, judo, tae kwon do), tennis, golf, badminton, gymnastics, volleyball, wrestling, boxing, bodybuilding competitions, powerlifting competitions, boat racing, rugby, softball, table tennis, track and field, and surfing competitions. Accordingly, discussion of the event application with baseball should not limit various embodiments of the invention.

Figure 4:
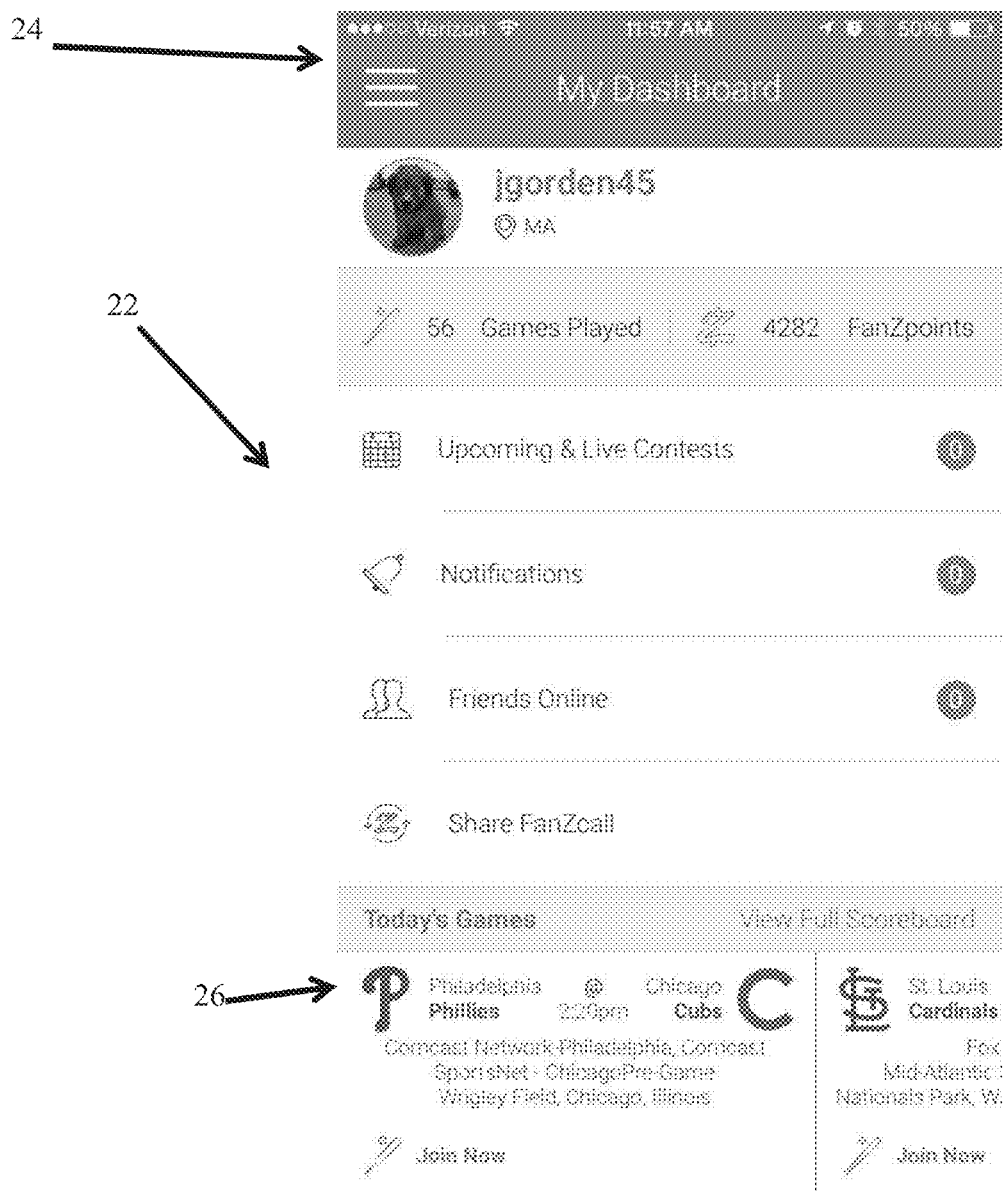
FIG. 4 schematically shows an exemplary screenshot of a dashboard to enable a user to select an event in accordance with illustrative embodiments of the invention.

Continuing with step 302, when opening the event application, the user may see an opening display 22 on the screen 12, such as that shown in FIG. 4. In this embodiment, the opening user interface has a dashboard 24 for the user, showing a plurality of different fields of information. In this example, the dashboard 24 shows the username "jgorden45," the total number of games played by this user (56 in this case), and the total number of points accumulated during all of those games (4282 points in this case). Accordingly, the user may reflect on their point total as a source of pride, and/or as a means for obtaining benefits, such as the noted sponsor gift cards, special recognition, etc.

The dashboard 24 also has an upcoming game field 26 listing games in which the user may participate using this event application. The user may slide this upcoming game field 26 to the left or right to select from a plurality of different game options. In this example, this field displays a baseball game between the Philadelphia Phillies and the Chicago Cubs at 2:20 pm on the current day. The user thus may choose this game, or another game, by selecting the hyperlink "Join Now," which sends a request to the event application to interact with the user based upon that specifically selected game.

Figure 5:
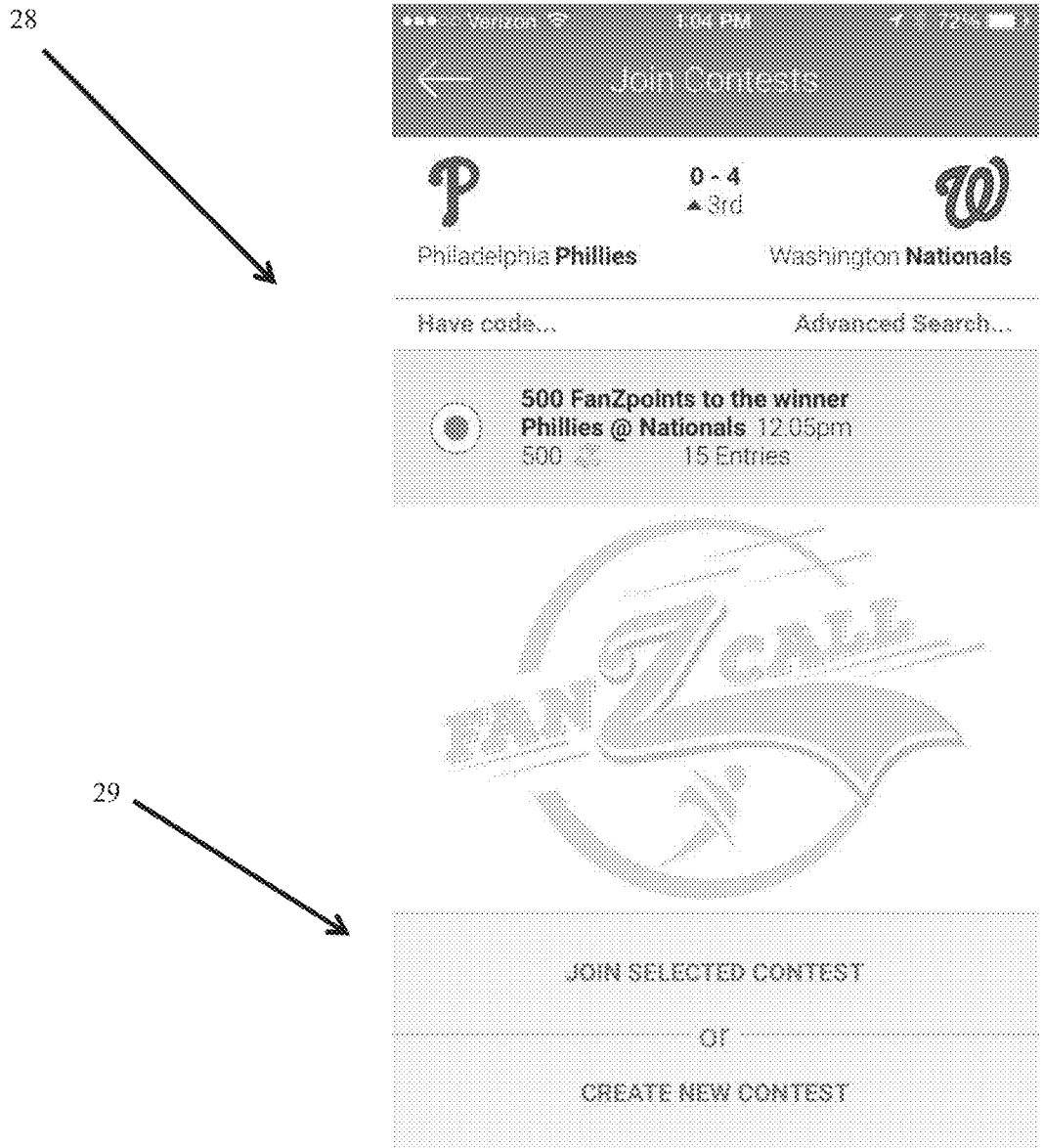
FIG. 5 schematically shows an exemplary screenshot enabling a user to join an event in accordance with illustrative embodiments of the invention.

Accordingly, after receiving the game selection (step 304), the event application displays an intermediate selection user interface 28, such as that shown in FIG. 5. Using this interface 28, the user may confirm that they desire to use the event application based upon the specific game listed in a joining field 29. In this example, the user may select "JOIN SELECTED CONTEST" to use the event application with the game between the Philadelphia Phillies and the Washington Nationals. In this case, the game already is underway, at the top of the third inning, with 15 current users. Continuing with this example, the user with the highest point total at the end of the game receives 500 bonus points (referred to in this example as "FanZpoints").

Figure 6:
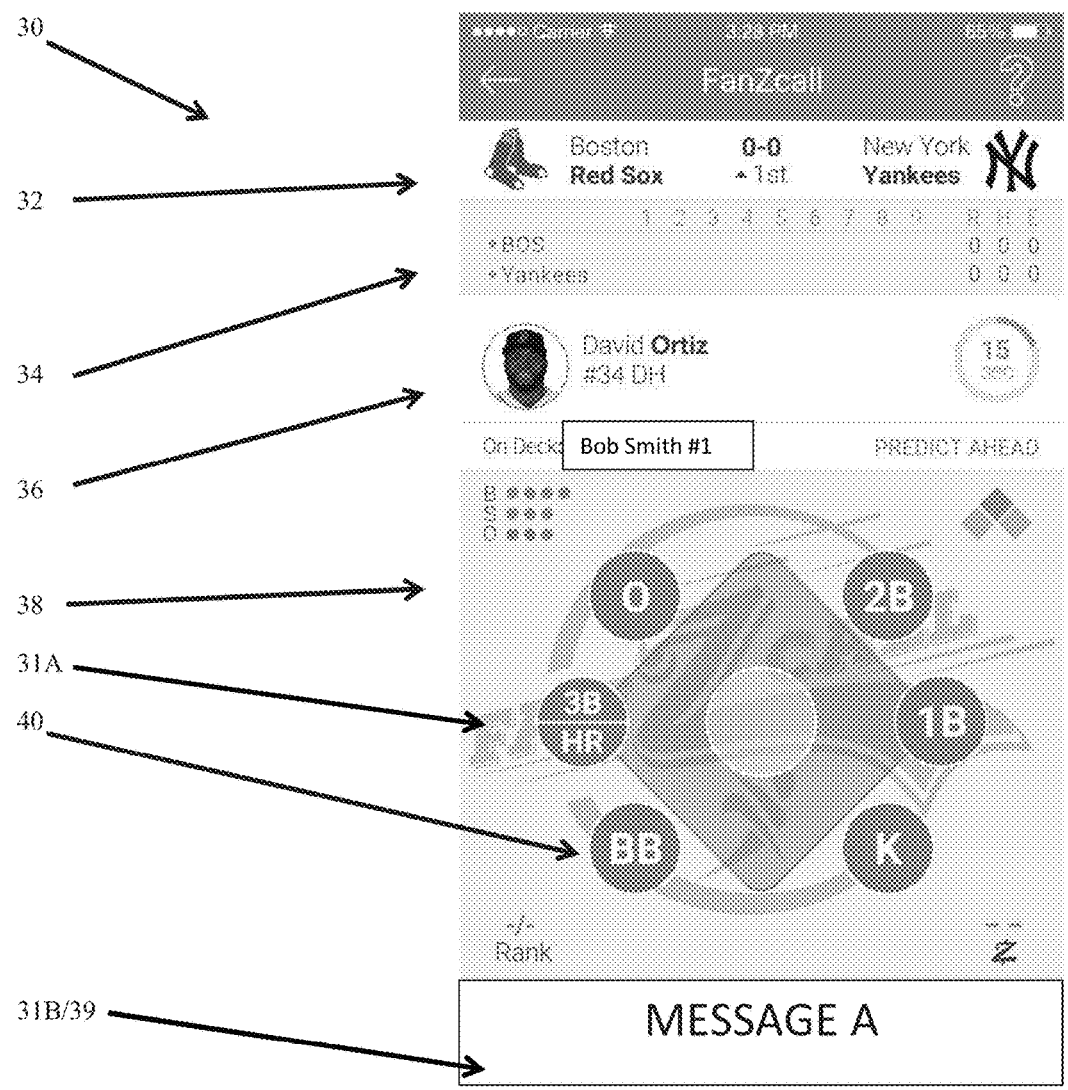
FIG. 6 schematically shows an exemplary screenshot of an event game interface having a user interface for entering selections immediately before a first player's at-bat in accordance with illustrative embodiments of the invention.

After selecting the appropriate game, the event application displays a game interface 30 as shown in FIG. 6, and begins receiving input information (step 306). In this example, the Boston Red Sox are playing the New York Yankees. It should be noted that to arrive at the game interface 30 of FIG. 6 showing this specific game (i.e., in this case, the Boston Red Sox versus the New York Yankees), the user should have selected this game in the corresponding previous user interfaces of FIGS. 4 and 5. Accordingly, even though the examples in FIGS. 4 and 5 show different games, to arrive at the game interface 30 of FIG. 6, the user should have selected the game shown in FIG. 6.

This game interface 30 has a plurality of different fields in different parts of the screen 12. For example, in this case, the different fields include:

- a team field 32 identifying the two teams, the score, and the inning,
- a scoreboard field 34 showing the number of runs, hits, and errors,
- a player field 36 identifying the player up to bat, the player that is on deck, and the amount of time left to make a prediction of what the player will do during their current at-bat,
- a prediction field 38 enabling the user to predict the results of the current at-bat, identifying the balls and strikes against the batter, the number of outs, players on base, and the point ranking of the user against the other users,
- a message field 39 for showing messages.

Note that the information in the figures is intended for illustrative purposes only. For example, some of the information in the team field 32 and scoreboard field 34 of the figures may include not be consistent. As one example, for the same at-bat, the team field 32 may show different innings across different figures. It nevertheless is reiterated that such figures are for illustrative purposes only.

The prediction field 38 has an event user interface 40 with various graphical indicia permitting the user to predict the outcome of the current player's at-bat. In this example, the event user interface 40 roughly is in the shape of a baseball diamond and has various prediction outcomes for the user to select. Rotating clockwise, the user can select one of the following prediction outcomes: a strikeout ("K"), a single ("1B"), a double ("2B"), and out ("O"), a triple or home run ("3B/HR"), or a walk ("BB").

Accordingly, at this stage, the input 18 of the display system 14 may begin receiving input information. In this example, the input 18 may receive user input from the prediction field 38 and its event user interface 40; i.e., the prediction of the user. In addition, the input 18 may receive machine readable, real-time event information relating to the game. In this case, that information may include any of the information to populate the various fields of the game interface 30. Specifically, the batter information, the balls and strikes, the score, etc., and any other information required by the event application. The event application thus uses this information to display various game facts in the various fields of the game interface 30. The message controller 20 receives this information, via the input 18, to control the display of various message indicia. One such message indicia is referred to as a "rotating message 31A," because it sometimes rotates between background and foreground in the prediction field 38. See related application, incorporated above and filed on even date herewith, for additional details of the rotating message 31A.

Figure 7:
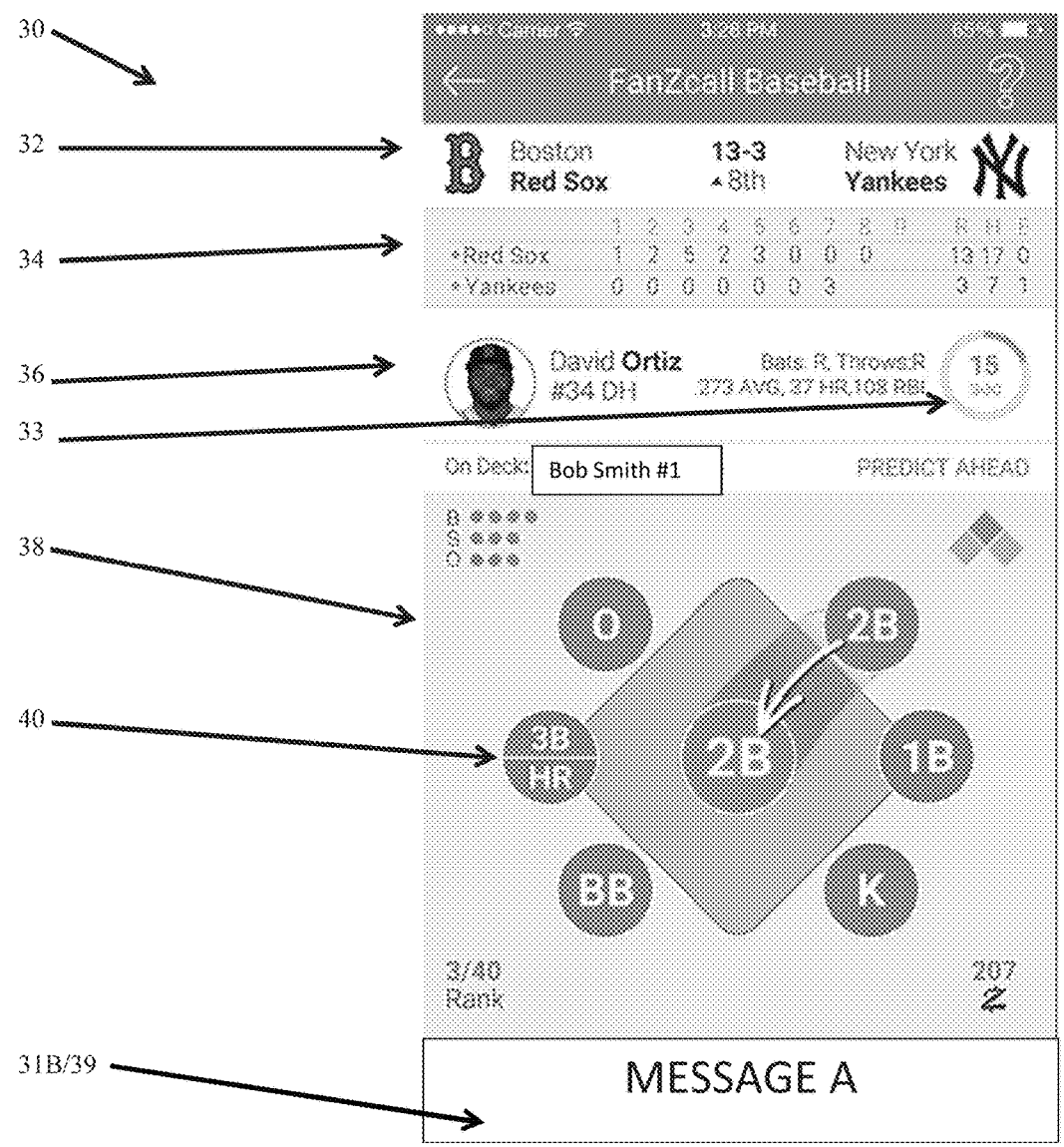
FIG. 7 schematically shows an exemplary screenshot showing a user making a prediction of the first player's at-bat of an activity in accordance with illustrative embodiments of the invention.

FIG. 7 schematically shows one way a user may predict the outcome of an activity of the event (e.g., the outcome of a player's at-bat). In this example, the user drags the icon of the selected prediction into the center of the diamond of the prediction field 38. Of course, those skilled in the art can use any of a number of different ways to select the prediction and thus, FIG. 7 is merely an example of one way to make the prediction.

To ensure that the prediction is not made with knowledge of the actual outcome of the given action, the prediction preferably is made before the end of the given action— before the outcome is known. For example, FIG. 7 uses a timer 33 to limit the amount of time that a user may make a prediction. The timer preferably expires before the end of the event (an at-bat in this example). In preferred embodiments, the timer preferably expires before the beginning of the event/at-bat.

In other words, the at-bat has a duration—the time extending from the beginning of the player's at-bat (e.g., the first pitch), until the player completes his/her at-bat. The input 18 thus preferably receives the user's selection before the completion of the at-bat (preferably before the first pitch to that player, although it could be after the first pitch). Of course, this duration is specifically determined by the stream of machine readable, real-time event information received by the input 18.

The message controller 20 (or other controller) thus sets the timer 33 to an appropriate start time at an appropriate moment during or before the at-bat. For example, the stream of machine-readable information may indicate that a previous player just struck out. At that time, the message controller 20 may set the timer to an amount of time in which the user can reasonably predict the outcome of the next player's at-bat before that at-bat begins (e.g., 30 seconds), and start the timer. This time preferably expires early enough to ensure that the prediction is made before that next player has started batting—or before the player has completed his/her current at-bat. Preferably, the message controller 20 sets the time to expire before the first pitch to that player. Due to the dynamic nature of the game, however, in rare instances, time may expire after the first pitch. In either case, the duration of the at-bat preferably has not expired (i.e., the player has not completed the at-bat before the timer expires).

Figure 8:
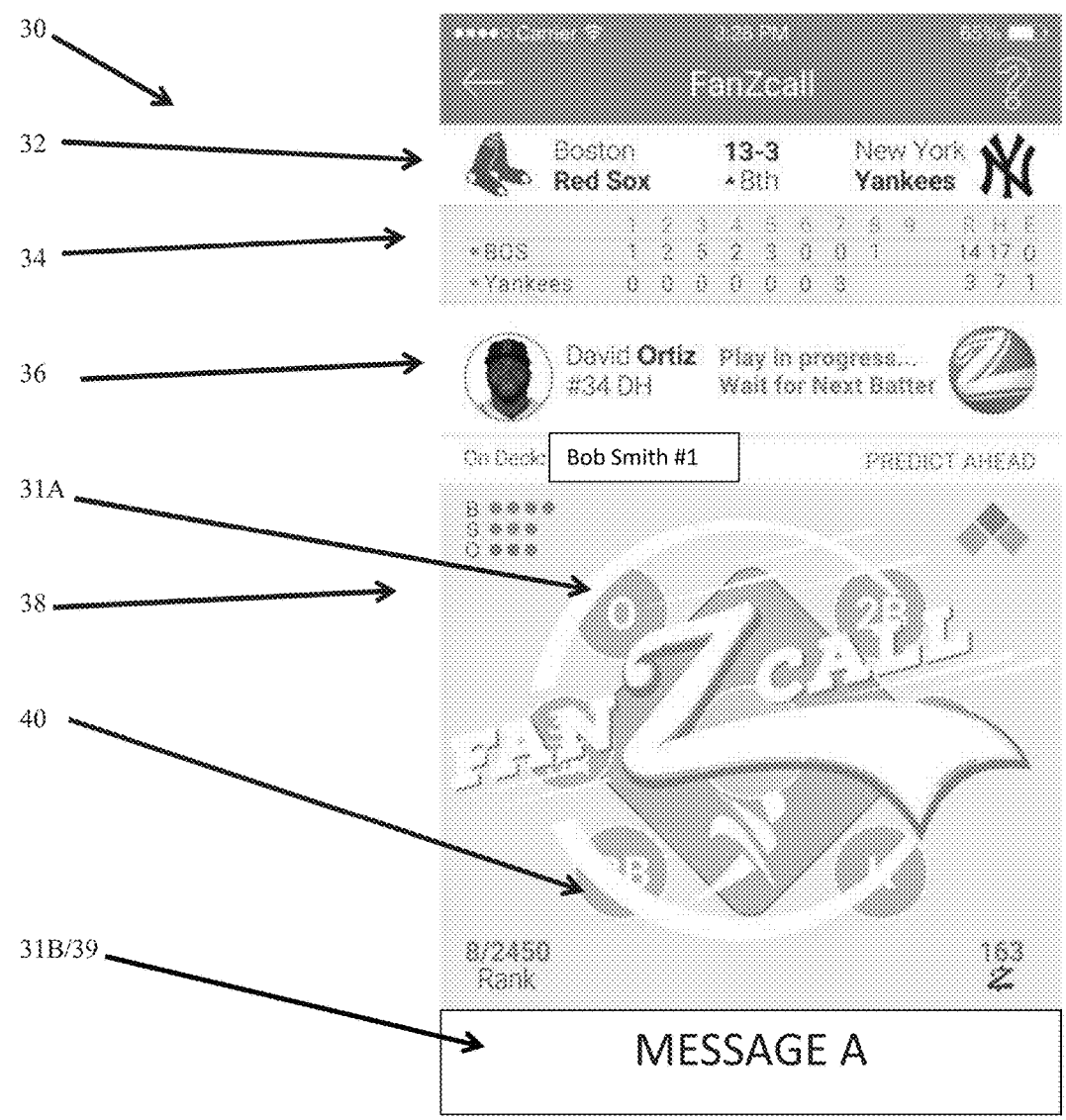
FIG. 8 schematically shows an exemplary screenshot of the event user interface during the at-bat of the first player in accordance with illustrative embodiments of the invention.

After receiving the prediction, the event application displays the prediction on the screen 12. At this point, the prediction cannot be changed. Other embodiments, however, may permit the user to change their prediction under prescribed circumstances. FIG. 8 schematically shows the game interface 30 at this time.

FIGS. 6-8 also show another message, referred to as a "serial message 31B," in the message field 39 because the message in that field 39 changes in a serial manner. In this embodiment, the serial message 31B remains in the message field 39 and does not extend beyond that field 39. More specifically, the message controller 20 manages a plurality of different prescribed serial messages 31B (e.g., stored in memory before the game), and determines when to multiplex those messages 31B into the message field 39. Indeed, displaying them at the same time is impractical, and displaying multiple serial messages 31B at the same time may be cumbersome and detract from the user experience.

Figure 9:
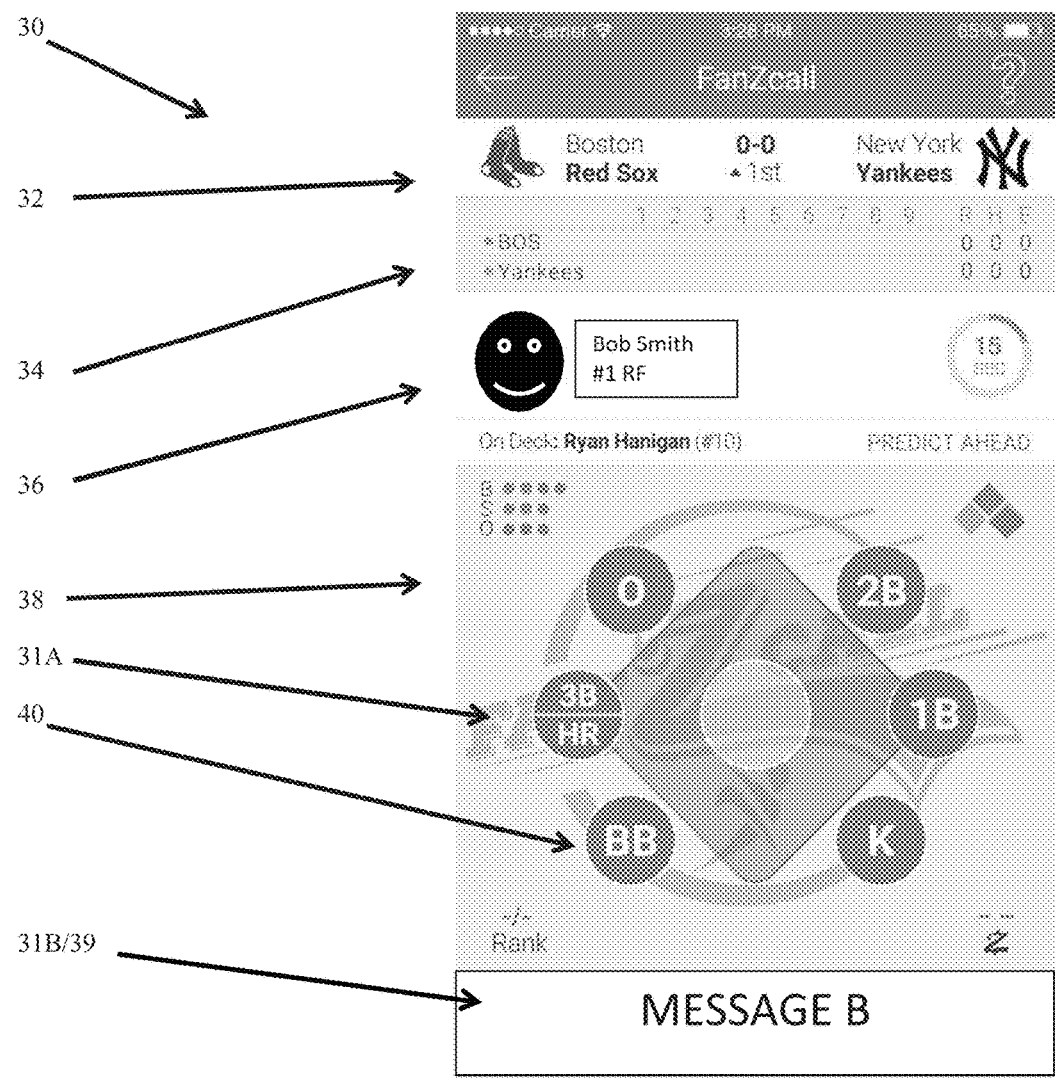
FIG. 9 schematically shows an exemplary screenshot of the event game interface before a prediction and immediately before a different player's at-bat in accordance with illustrative embodiments of the invention.
Figure 10:
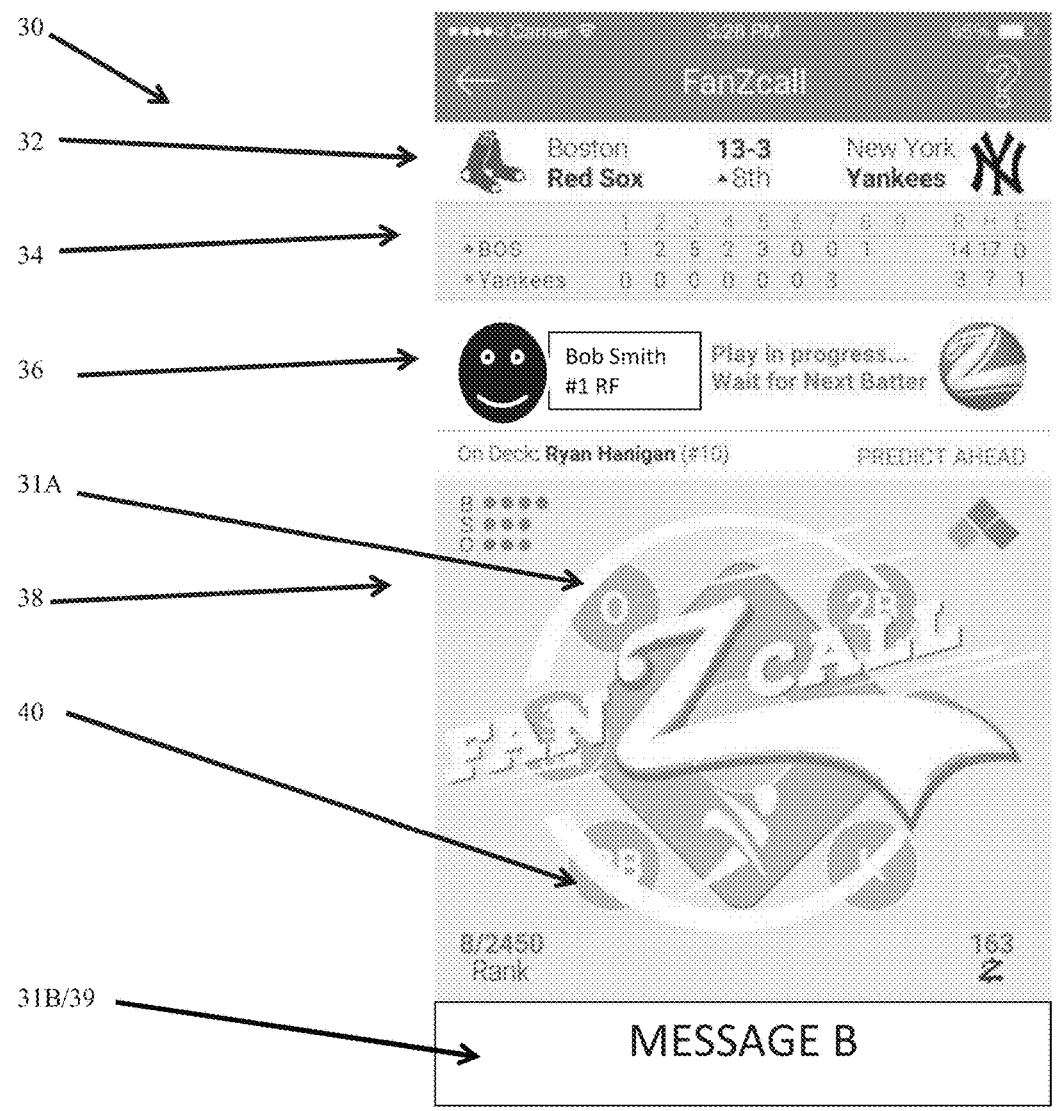
FIG. 10 schematically shows an exemplary screenshot of the event user interface during the at-bat of the player of FIG. 9 in accordance with illustrative embodiments of the invention.

FIGS. 6-8 show the serial message 31B as "Message A," while FIGS. 9-10 show the generic serial message 31B as another message, "Message B." Of course, those skilled in the art can use any of a wide variety of types of messages, including words, pictures, and other graphical indicia. For example, the serial message 31B can include information relating to any of a variety of things, such as an advertisement from some company or organization, or information about the game (e.g., a history of the teams or the background of the current batter). Such messages may be considered to be "prescribed messages" because their content is pre-determined (e.g., a logo from an advertisement campaign, or a canned expression to highlight an event-specific item) and stored in some remote or local memory for future display. As another example, the message 31A can include information from a third party, (e.g., a friend saying where to meet after the game, or an important safety warning from the National Weather Service about an impending thunderstorm). As such, the serial message 31B may include incoming text from an instant message, SMS message, electronic mail, or other data source. In illustrative embodiments, a remote computing device may serve and/or control the content of the message.

After displaying the event user interface 40, the method continues to step 308, in which the message controller 20 determines the order to display the serial messages 31B. Specifically, in illustrative embodiments, the display system 14 has a plurality of serial messages 31B lined up to be displayed during the current sporting event. For example, a set of serial messages 31B (e.g., as a list and/or the messages themselves) may be stored in memory ready to be displayed. During the event, the message controller 20 may add new serial messages 31B to that set and, likewise, remove some of the serial messages 31B from that list. Accordingly, the message controller 20 may use some method to determine when to display the messages 31B. For example, the message controller 20 or other mechanism may assign a value to each serial message 31B and use that value to determine which serial message 31B is to be displayed first, second, etc. Other embodiments may use other means for determining the order, such as a random selection, an event-driven approach based on what is happening during event, a formulaic approach, or a revenue driven approach (e.g., serial messages 31B that generate more revenue may be displayed before others that generate less revenue).

Accordingly, at step 310, the message controller 20 retrieves the next serial message 31B which, in this first pass through the process, is the first serial message 31B in the set as determined by step 308. The message controller 20 then determines a "display number" associated with the serial message 31B (step 312). Specifically, in accordance with illustrative embodiments, each serial message 31B is displayed not solely as a function of time, but as a function of a prescribed number of activities of the sporting event. For example, if used with a baseball game, each serial message 31B is displayed during a prescribed number of at-bats. As such, a given serial message 31B may be displayed during one at-bat, two at-bats, three at-bats, ten at-bats, etc. If the serial message 31B is an advertisement, for example, then the sponsor of that message 31B can pay a specified amount per at-bat. As another example, if the serial message 31B relates to an important fact about the game, then that serial message 31B may be displayed as a function of the importance of the fact.

Accordingly, at some preliminary stage, the message controller 20 or other entity assigns a display number to each serial message 31B. As discussed, the display number is equal to the maximum total number of events in which a serial message 31B may be displayed in the message field 39. For example, if the display number of a given serial message 31B is 6, then that given serial message 31B will be displayed up to 6 consecutive or non-consecutive times during the event across some or all of the users' game interfaces 30. Indeed, there may be instances when that given serial message 31B is not displayed 6 times, such as if the event ends earlier than planned. Also, in some embodiments, the message field 39 can move to different areas of the game interface 30.

Thus, at step 312, the message controller 20 sets a counter, referred to as a "display number counter," or, for simplicity, "counter" to the display number of the current serial message 31B. Next, at step 314, the message controller 20 displays the current serial message 31B, as determined at step 310, in the foreground of the message field 39—preferably when receiving the stream of real-time event information. In addition, the message controller 20 decrements the counter so that the serial message 31B is shown no more than one fewer instance during the event.

The current serial message 31B thus remains displayed for a period of time that preferably ends at the end of the current activity. For example, the current serial message 31B may display while the user is making a prediction (FIGS. 6 and 7), and after the user makes the prediction (FIG. 7) to the end of the current activity (e.g., the at-bat, FIG. 8). The time it takes for an activity to ultimately end may be referred to as the "activity time" of the activity. Accordingly, the current serial message 31B is displayed for a period as a function of the activity time and the display number. In some embodiments, however, the message controller 20 may display the current serial message 31B for some other duration that still is a function of the display number. For example, in some of those embodiments, the message controller 20 may start the next message at some earlier moment before the end of the current activity of the event.

In alternative embodiments, the message controller 20 may serially display sets of plural serial messages 31B. For example, the message controller 20 may display a set of two serial messages 31B during a first player's at-bat, and a second set of two other serial messages 31B during another player's at-bat.

After the current activity (e.g., the current player's at-bat) completes, then the process continues to step 316, in which the message controller 20 determines if the currently displayed serial message 31B is to be displayed again at this current time (i.e., consecutively). To that end, the message controller 20 checks the counter. If the counter is at a minimum count (e.g., 0), then the currently displayed serial message 31B will not be displayed again and the method continues to step 318 (discussed below). If the counter is not at the minimum count, however, then the message controller 20 determines if it will display the current message again at the current time, or at a later time. If it is to be displayed again at this current time, then the process loops back to step 314.

Conversely, if the message controller 20 determines at step 316 that it will not display that same message again at the current time, then the process continues to step 318, in which the message controller determines if there are more serial messages 31B to display. If there are more messages left (e.g., not all counters are at their minimum number), the process loops back to step 310, which displays a next serial message 31B. FIGS. 9 and 10 respectively show an example of this next serial message 31B as a different message ("Message B"), displayed during the prediction selection phase and during the player's at-bat.

If no serial messages 31B remain to be displayed at step 318 (e.g., neither the current serial message 31B nor other serial messages 31B), then process ends.

Thus, as noted above, each serial message 31B is considered to be displayed for some maximum total time period as a function of at least two variables—the prescribed display number and the activity time for the activity being completed. This total time therefore may occur consecutively during multiple consecutive activities and/or separated by other activities. For example, a given serial message 31B may display, without interruption, during the last two players' at-bats during the fourth inning, the time between their at-bats, the time between the fourth and fifth innings, and the first player's at-bat during the fifth inning. Alternatively, this total time may occur at different times, such as during a first player's at-bat during the fifth inning and during another player's at-bat during the ninth inning.

Other embodiments may display serial messages 31B using the process above, and intersperse other types of messages based upon other criteria. For example, some embodiments may display another message in the message field 39 for a prescribed time between the times of displaying two serial messages 31B.

Accordingly, illustrative embodiments permit display of a plurality of messages in a serial manner based up the activities of the event—not based solely on a prescribed time. This screen space allocation enables more efficient and effective display of the plurality of messages across the limited space of the screen 12—particularly that of a smartphone.

Various embodiments of the invention may be implemented at least in part in any conventional computer programming language. For example, some embodiments may be implemented in a procedural programming language (e.g., "C"), or in an object oriented programming language (e.g., "C++"). Other embodiments of the invention may be implemented as a pre-configured, stand-along hardware element and/or as preprogrammed hardware elements (e.g., application specific integrated circuits, FPGAs, and digital signal processors), or other related components.

In an alternative embodiment, the disclosed apparatus and methods (e.g., see the flow chart described above) may be implemented as a computer program product for use with a computer system. Such implementation may include a series of computer instructions fixed either on a tangible, non-transitory medium, such as a computer readable medium (e.g., a diskette, CD-ROM, ROM, or fixed disk). The series of computer instructions can embody all or part of the functionality previously described herein with respect to the system.

Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies.

Among other ways, such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). In fact, some embodiments may be implemented in a software-as-a-service model ("SAAS") or cloud computing model. Of course, some embodiments of the invention may be implemented as a combination of both software (e.g., a computer program product) and hardware. Still other embodiments of the invention are implemented as entirely hardware, or entirely software.

Although the above discussion discloses various exemplary embodiments of the invention, it should be apparent that those skilled in the art can make various modifications that will achieve some of the advantages of the invention without departing from the true scope of the invention.

What is claimed is:

1. A sporting event display system for allocating screen space for display of a plurality of prescribed messages on a display device during a sporting event having a plurality of activities, each activity ultimately having an outcome and taking an activity time to complete, the display system comprising:
   a display configured to display, in real time when receiving a stream of real-time event information relating to the sporting event, an event user interface having selection indicia, the selection indicia being configured to enable a user to predict the outcome of at least one of the plurality of activities of the sporting event in real time;
   an input operatively coupled with the display, the input being configured to receive input information, the input information including the stream of electronic, machine readable real-time event information, the input information also including a plurality of predictions from the event user interface;
   a message controller operatively coupled with the display, the message controller being configured to assign, to each message, a prescribed display number that is equal to a prescribed number of activities of the sporting event,
the message controller also being configured to display, in series, each of the plurality of messages in the foreground of the display in real time when receiving the stream of real-time event information,
   each message being displayed for no more than a total time period during the event,
   the total time period being a function of both 1) the prescribed display number, and 2) the activity time for the activity being completed when the message is displayed.

2. The display system as defined by claim 1 wherein message controller is configured to:
   display a first message on the display during a first activity of the event;
   display a second message on the display during a second activity of the event; and
   display the first message on the display during a third activity of the event,
   the second activity occurring between the first and third activities.

3. The display system as defined by claim 1 wherein the message controller is configured to:
   display a first message on the display during a first activity of the event;
   display the first message on the display during a second activity of the event; and
   display a second message on the display during a third activity of the event, the first and second activities being consecutive activities, the third activity being before or after the first and second activities.

4. The display system as defined by claim 1 further comprising a timer configured to display a prescribed time and countdown for the user to make the prediction with the event user interface, the total time period also being a function of the prescribed time for the user to make the prediction.

5. The display system as defined by claim 1 wherein the message is spaced from and not covering the event user interface when displayed.

6. The display system as defined by claim 1 wherein the sporting event is a football game or a baseball game.

7. The display system as defined by claim 6 wherein the sporting event is a baseball game and at least one of the plurality of activities includes an at-bat of a player of the baseball game.

8. The display system as defined by claim 1 wherein the stream of real time event information is received live or delayed by no more than 45 seconds from live.

9. The display system as defined by claim 1 wherein the display device comprises a smartphone or a tablet.

10. A method of allocating screen space for display of a plurality of prescribed messages on a display device during a sporting event having a plurality of activities, each activity ultimately having an outcome and taking an activity time to complete, the method comprising:
    receiving a stream of electronic, machine readable real-time event information relating to the sporting event;
    displaying, on the display device in real time when receiving the stream of real-time event information, an event user interface having selection indicia, the selection indicia being configured to enable a user to predict the outcome of at least one of the plurality of activities of the sporting event in real time;
    assigning, to each message, a prescribed display number that is equal to a prescribed number of activities of the sporting event; and
    displaying, in series, each of the plurality of messages in the foreground of the display in real time when receiving the stream of real-time event information, each message being displayed for no more than a total time period during the event,
    the total time period being a function of both 1) the prescribed display number, and 2) the activity time for the activity being completed when the message is displayed.

11. The method as defined by claim 10 wherein displaying, in series, each of the plurality of messages comprises:

displaying a first message during a first activity of the event;

displaying a second message during a second activity of the event; and displaying the first message during a third activity of the event, the second activity occurring between the first and third activities.

12. The method as defined by claim 10 wherein displaying, in series, each of the plurality of messages comprises:

displaying a first message during a first activity of the event;

displaying the first message during a second activity of the event; and displaying a second message during a third activity of the event, the first and second activities being consecutive activities, the third activity being before or after the first and second activities.

13. The method as defined by claim 10 further comprising providing a prescribed time for the user to make the prediction with the event user interface, the total time period also being a function of the prescribed time for the user to make the prediction.

14. The method as defined by claim 10 wherein the message is spaced from and not covering the event user interface.

15. The method as defined by claim 10 wherein the message includes selectable indicia, further comprising selecting the selectable indicia, and producing a visual code in response to the selection.

16. The method as defined by claim 10 wherein the sporting event is a football game or a baseball game.

17. The method as defined by claim 16 wherein the sporting event is a baseball game and at least one of the plurality of activities includes an at-bat of a player of the baseball game.

18. The method as defined by claim 10 wherein the stream of real-time event information is received live or delayed by no more than 45 seconds from live.

19. The method as defined by claim 10 wherein the display device comprises a smartphone or a tablet.

20. The method as defined by claim 10 wherein the prescribed display number is equal to a prescribed number of past or potential future predictions using the event user interface during the sporting event.

21. A computer program product for use on a computer system for allocating screen space for display of a plurality of prescribed messages on a display device during a sporting event having a plurality of activities, each activity ultimately having an outcome and taking an activity time to complete, the computer program product comprising a tangible, non-transient computer usable medium having computer readable program code thereon, the computer readable program code comprising:

program code for receiving a stream of electronic, machine readable real-time event information relating to the sporting event;

program code for displaying, on the display device in real time when receiving the stream of real-time event information, an event user interface having selection indicia, the selection indicia being configured to enable a user to predict the outcome of at least one of the plurality of activities of the sporting event in real time;

program code for assigning, to each message, a prescribed display number that is equal to a prescribed number of activities of the sporting event; and program code for displaying, in series, each of the plurality of messages in the foreground of the display in real time when receiving the stream of real-time event information, each message being displayed for no more than a total time period during the event, the total time period being a function of both 1) the prescribed display number, and 2) the activity time for the activity being completed when the message is displayed.

22. The computer program product as defined by claim 21 wherein the program code for displaying, in series, each of the plurality of messages comprises:

program code for displaying a first message during a first activity of the event;

program code for displaying a second message during a second activity of the event; and program code for displaying the first message during a third activity of the event, the second activity occurring between the first and third activities.

23. The computer program product as defined by claim 21 wherein the program code for displaying, in series, each of the plurality of messages comprises:

program code for displaying a first message during a first activity of the event;

program code for displaying the first message during a second activity of the event; and program code for displaying a second message during a third activity of the event, the first and second activities being consecutive activities, the third activity being before or after the first and second activities.

24. The computer program product as defined by claim 21 further comprising program code for providing a prescribed time for the user to make the prediction with the event user interface, the total time period also being a function of the prescribed time for the user to make the prediction.

25. The computer program product as defined by claim 21 wherein the sporting event is a football game.

26. The computer program product as defined by claim 21 wherein the stream of real-time event information is received live or delayed by no more than 45 seconds from live.

27. The computer program product as defined by claim 21 wherein the prescribed display number is equal to a prescribed number of past or potential future predictions using the event user interface during the sporting event.

* * * * *